(No Model.)

J. PROBST.
WHEEL FOR BICYCLES.

No. 597,431. Patented Jan. 18, 1898.

ATTEST
R. B. Moser
H. E. Mudra

INVENTOR
John Probst.
BY H. T. Fisher ATTY

THE NORRIS PETERS CO., PHOTO-LITHO., WASHINGTON, D. C.

UNITED STATES PATENT OFFICE.

JOHN PROBST, OF CLEVELAND, OHIO.

WHEEL FOR BICYCLES.

SPECIFICATION forming part of Letters Patent No. 597,431, dated January 18, 1898.

Application filed October 5, 1897. Serial No. 654,154. (No model.)

*To all whom it may concern:*

Be it known that I, JOHN PROBST, a citizen of the United States, residing at Cleveland, in the county of Cuyahoga and State of Ohio, have invented certain new and useful Improvements in Wheels for Bicycles and Like Vehicles; and I do declare that the following is a full, clear, and exact description of the invention, which will enable others skilled in the art to which it appertains to make and use the same.

My invention relates to improvements in wheels for bicycles and like vehicles in which a cushioned or spring tire is employed; and the invention consists in a combined pneumatic and mechanical spring-tire in which the springs coöperate with the pneumatic chambers to sustain the tread and serve also to promote or accelerate the travel of the wheel, substantially as shown and described, and particularly pointed out in the claims.

Figure 1:
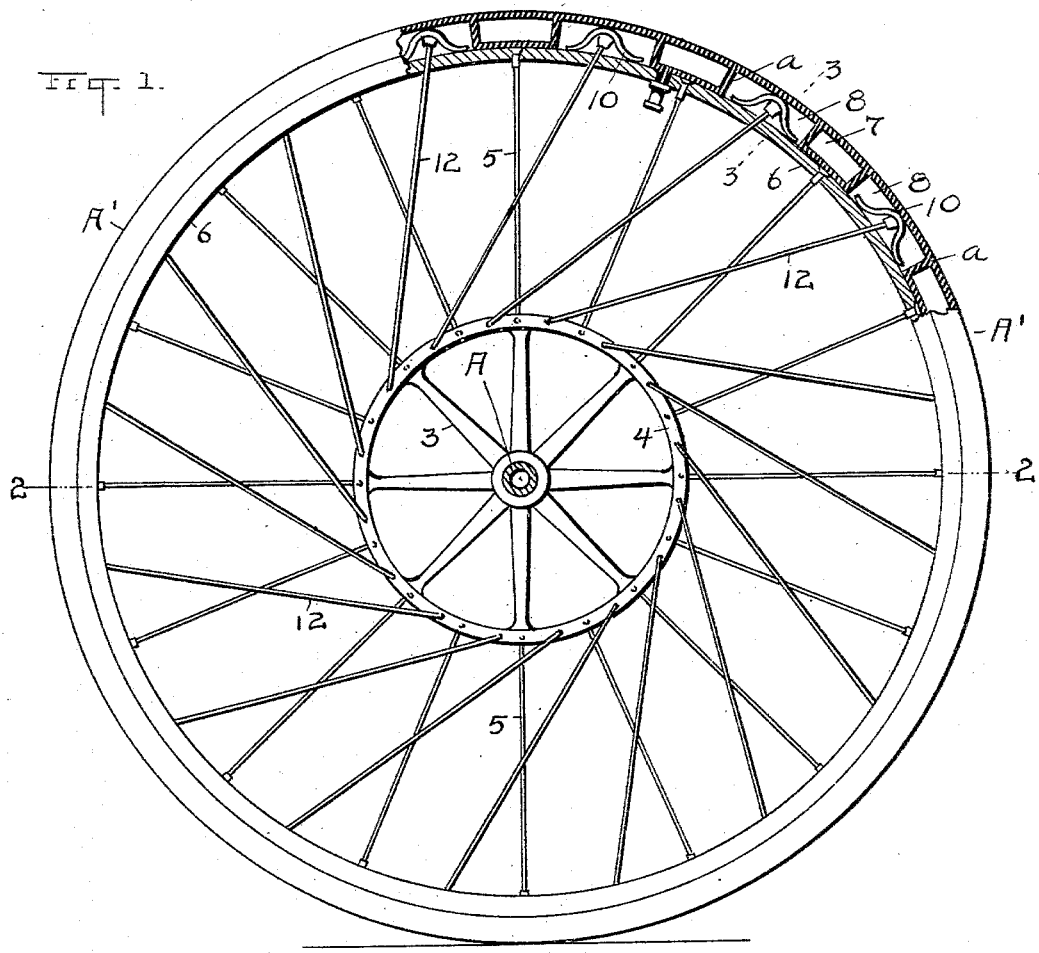
Figure 2:
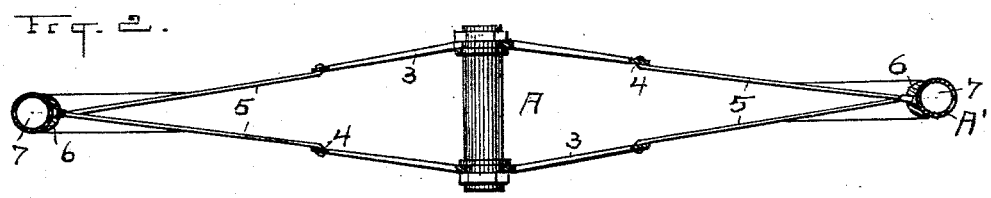
Figure 3:
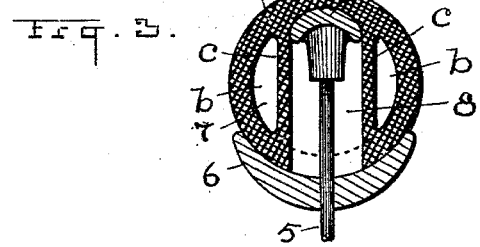

In the accompanying drawings, Figure 1 is a side elevation of a wheel embodying my improvements with a portion of the tire in vertical section, so as to disclose its internal construction and the connection of parts therewith, as hereinafter more fully described. Fig. 2 is a cross-section of the wheel on line 2 2, Fig. 1. Fig. 3 is a cross-section of the tire and its rim on line 3 3, Fig. 1, and enlarged, so as to more clearly disclose the invention.

The invention, as thus shown, comprises a wheel with a hub A and a series of rigid radiating spokes 3, terminating on ring 4, there being two rings and two sets of spokes from opposite ends of the hub, all arranged substantially as shown. The wire rods 5, which ordinarily radiate from the hub of the wheel, start in this instance from the rings 4 and carry and sustain the wooden rim 6 of the wheel, whereto they are fastened in any usual or sufficient way.

Now, in order, first, that a tire may be produced which cannot be wholly disabled by puncturing, I provide a rubber tire A' of the peculiar construction herein shown. This construction comprises a series of pneumatic chambers 7 and a series of spring-chambers 8, arranged alternately and continuously about the tire, and the said chambers respectively are of such size that at least one of each kind will be successively and always exposed at the tread and divide the tread—that is, so that at any and all times the weight upon the wheel will be divided between two of the chambers 7 and 8, and thus secure the advantage of a combined pneumatic and mechanical spring-tread. In one sense, however, the tire may be considered a pneumatic tire in that it has a continuous pneumatic pressure and connection. Thus the various pneumatic chambers 7 are separated from the spring-chambers 8 by the transverse walls $a$, and all said chambers 7 are connected together by the passages $b$ on opposite sides of the successive spring-chambers 8 and from which said passages are separated by walls $c$. These passages $b$ on each side of chamber 7 of course sustain the same atmospheric pressure as the said chambers 7, and so we have the pneumatic principle along with the springs between the wall $c$ to support and sustain the tread and pressure which comes upon the spaces intermediate of the respective pneumatic chambers; but in order that my principle of construction may be perfected and that mechanical springs may be advantageously utilized with the pneumatic chambers I arrange a spring 10, shaped substantially as shown in Fig. 1, in each of said chambers or recesses 8, and connect with each spring diagonally-arranged wire spokes 12, set eccentrically to the axis of the wheel in the rings 4, in which they are alternately arranged in one and the other of said rings, substantially as shown. By this diagonal or tangential arrangement of the spokes or wires 12 at an angle which will carry the inner ends thereof past a vertical line at the hub as the spring of each wire successively comes to the tread I am enabled not only to utilize said springs, as already described, to carry the load, but their reaction as the load gets off is exerted to help rotate the wheel, and this is one of the objects of the special arrangements of wires 12 and their springs, as herein shown and described.

It will be noticed that the springs 10 have a rounded bearing at the tread, while their arms or ends rest upon the wooden inner rim 6, and the wires 12 pass through the said rim and are socketed centrally in the said springs, thus rigidly connecting said springs and wires.

This holds each spring in the tire, and at the same time it is left perfectly free to exercise its functions as a spring and in carrying the load in conjunction with the pneumatic chamber 7.

It will also be noticed that the inner ends of wires 12 are so placed in respect to the axis of the wheel that as each spring 10 comes down into the tread its wire 12 is well past the center or radial line and where the reaction of the spring will help to rotate or turn the wheel, as already described. The springs 10 are therefore relied upon to measurably accelerate the rotation of the wheel besides protecting the tire.

What I claim is—

1. A rubber tire for wheels having a series of alternately-arranged pneumatic chambers and open chambers, said open chambers closed on their outside and open on their inside toward the hub of the wheel and having side walls, substantially as described.

2. A rubber tire substantially as described, having a series of successively-arranged pneumatic chambers with intermediate open chambers, and wall-channels connecting said pneumatic chambers, substantially as set forth.

3. A combined pneumatic and mechanical spring-tire having alternately-arranged open and closed chambers, and wall-passages at the sides of the said open chambers, connecting said closed chambers, substantially as described.

4. The tire described having a series of pneumatic chambers and a series of open intermediate chambers, and springs in said spring-chambers, substantially as described.

5. A wheel substantially as described, having a series of radial wires for supporting the rim, and a pneumatic tire having a series of open chambers, springs in said open chambers and brace-wires for said springs set at a tangent to radial lines from the hub of said wheel, substantially as described.

6. A wheel having a series of spring-supporting wires for the tire arranged diagonally to radial lines from the hub thereof, a flexible tire and springs in said tire engaged by said diagonal wires, substantially as set forth.

Witness my hand to the foregoing specification this 18th day of September, 1897.

JOHN PROBST.

Witnesses:
H. T. FISHER,
R. B. MOSER.